US009191650B2

(12) United States Patent
Lo et al.

(10) Patent No.: US 9,191,650 B2
(45) Date of Patent: Nov. 17, 2015

(54) VIDEO OBJECT LOCALIZATION METHOD USING MULTIPLE CAMERAS

(75) Inventors: Kuo-Hua Lo, Kaohsiung (TW); Jen-Hui Chuang, Hsinchu (TW); Horng-Horng Lin, Hsinchu County (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 361 days.

(21) Appl. No.: 13/487,264

(22) Filed: Jun. 4, 2012

(65) Prior Publication Data

US 2012/0320162 A1 Dec. 20, 2012

Related U.S. Application Data

(60) Provisional application No. 61/498,619, filed on Jun. 20, 2011.

(51) Int. Cl.
*H04N 13/02* (2006.01)
*H04N 13/00* (2006.01)
*G06T 7/00* (2006.01)

(52) U.S. Cl.
CPC .......... *H04N 13/0242* (2013.01); *G06T 7/0067* (2013.01); *H04N 13/0007* (2013.01); *H04N 13/0246* (2013.01)

(58) Field of Classification Search
None
See application file for complete search history.

(56) References Cited

U.S. PATENT DOCUMENTS

| 2008/0285798 | A1* | 11/2008 | Kubota | 382/103 |
| 2009/0304265 | A1* | 12/2009 | Khan et al. | 382/154 |
| 2010/0232682 | A1* | 9/2010 | Fujieda et al. | 382/154 |
| 2010/0295948 | A1* | 11/2010 | Xie et al. | 348/175 |
| 2011/0007072 | A1 | 1/2011 | Khan et al. | |

OTHER PUBLICATIONS

Hu, et al., "Principal Axis-Based Correspondence between Multiple Cameras for People Tracking," IEEE Transactions on Pattern Analysis and Machine Intelligence, vol. 28, No. 4, Apr. 2006.*
S.M.Khan and M.Shah, "Tracking multiple occluding people by localizing on multiple scene planes," IEEE Trans. Pattern Analysis and Machine Intelligence, vol. 31, No. 3, pp. 505-519, 2009.
J.Orwell, S.Massey, P. Remagnino, D. Greenhill, and G. A. Jones, "A multi-agent framework for visual surveillance," in Proc. Int'l Conf. Image Analysis and Processing, 1999.
A.Mittal and L.S. Davis, "M2 Tracker: a multi-view approach to segmenting and tracking people in a cluttered scene," Int'l Journal of Computer Vision, vol. 51, No. 3,pp. 189-203, 2003.

(Continued)

*Primary Examiner* — Thai Tran
*Assistant Examiner* — Christopher T Braniff
(74) *Attorney, Agent, or Firm* — CKC & Partners Co., Ltd.

(57) ABSTRACT

An efficient 3D object localization method using multiple cameras is provided. The proposed method comprises a three-dimensional object localization process that firstly generates a plurality of two-dimensional line samples originated from a pre-calibrated vanishing point in each camera view for representing foreground video objects, secondly constructs a plurality of three-dimensional line samples from the two-dimensional line samples in all the multiple camera views, and thirdly determines three-dimensional object locations by clustering the three-dimensional line samples into object groups.

8 Claims, 5 Drawing Sheets

(56) References Cited

OTHER PUBLICATIONS

T.-H. Chang and S. Gong. "Tracking multiple people with a multi-camera system," in Proc. IEEE Workshop Multi-Object Tracking, 2001.

R. Eshel and Y. Moses, "Homography based multiple camera detection and tracking of people in a dense crowd," in Proc. IEEE Int'l Conf. Computer Vision and Pattern Recognition, 2008.

R. Eshel and Y. Moses, "Tracking in a dense crowd using multiple cameras," Int'l Journal of Computer Vision, vol. 88, No. 1, pp. 129-143—2010.

W. Hu, M. Hu, X. Zhou, T. Tan, J. Lou, and S. Maybank, "Principal axis-based correspondence between multiple camera for people tracking," IEEE Trans. Pattern Analysis and Machine Intelligence, vol. 28.

\* cited by examiner

VIDEO OBJECT LOCALIZATION METHOD USING MULTIPLE CAMERAS

RELATED APPLICATIONS

This application claims priority to U.S. provisional Application Ser. No. 61/498,619, filed Jun. 20, 2011, which is herein incorporated by reference.

BACKGROUND

1. Technical Field

The present disclosure relates to an image processing method.

Particularly, the present disclosure relates to a computer-vision-based three-dimensional object localization method using multiple cameras.

2. Description of Related Art

In recent years, vision-based localization and tracking have shifted from monocular approaches to multi-camera approaches since more image information provided by multiple cameras can be used to resolve object occlusions. However, most conventional multi-camera approaches apply pixel-based processing to compute three-dimensional (3D) object locations. They are thus not quite suitable for real-time applications because they often need costly coordinate transformations of all foreground pixels in multiple camera views to different 3D reference planes. Accordingly, we propose a new 3D object localization method that can largely reduce the computation of coordinate transformations in multiple camera views for the 3D localization of video objects.

SUMMARY

The present disclosure is to introduce an object localization method using vanishing point-based line sampling for video surveillance using multiple cameras. Specifically, the present disclosure utilizes a plurality of static cameras to capture video sequences of a scene of interest. An aspect of the present disclosure comprises a 3D object localization process that firstly generates a plurality of two-dimensional (2D) line samples originated from a pre-calibrated vanishing point in each camera view, secondly constructs a plurality of 3D line samples from the 2D line samples in all the camera views, and thirdly determines 3D object locations by clustering the 3D line samples.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Vision-based object localization and tracking have shifted in recent years from monocular approaches to multi-camera approaches because multiple cameras provide more information than a single camera in resolving occlusions. In multiple camera approaches, region information is often applied to match video objects, say people, in multiple views. For instance, in S. M. Khan and M. Shah, "Tracking multiple occluding people by localizing on multiple scene planes," *IEEE Trans. Pattern Analysis and Machine Intelligence*, vol. 31, no. 3, pp. 505-519, 2009, the Khan and Shah propose a multi-camera approach to track occluded people by locating them on multiple 3D reference planes.

While the above-mentioned multi-camera approaches deal well with scenes of a dense crowd, they are not, in general, suitable for real-time applications because these approaches often need costly coordinate transformations of all foreground pixels in multiple camera views to different 3D reference planes. To enhance efficiency, we propose a new three-dimensional object localization method that can largely reduce the computation of coordinate transformations in multiple camera views for the 3D localization of video objects.

Two processes, (1) the 3D object localization process and (2) the camera calibration process, are included in the proposed method of 3D video object localization. In the following presentations of the proposed method, we start with the descriptions of the 3D object localization process, followed by that of the camera calibration process.

3D Object Localization Process

The main idea of the proposed 3D object localization process is to apply efficient projections of 2D line samples originated from pre-calculated vanishing points in camera views. Specifically, we project 2D line samples of foreground regions from all camera views to 3D reference planes at different heights via homography transformation, and generate 3D line samples. By filtering out noise of the 3D line samples and grouping the remaining ones into object clusters, stable localization results of video objects can be obtained by cluster centers. Since the proposed video object localization method is based on the processing of line samples originated from vanishing points, it is much faster than the video object localization methods based on the processing of foreground pixels, and does not sacrifice the localization accuracy.

Axis-Based Video Object Localization

For better understanding of the basic idea of the proposed vanishing point-based line sampling in the 3D object localization process, we begin by illustrating how to localize video objects, say people, given their 2D major axes (2D MAs). However, in real cases, the estimation of 2D major axes of objects in images may be unstable for crowded scenes. Therefore, we introduce vanishing point-based line samples to replace 2D MAs of video objects. The adoption of vanishing point-based line samples gives promising accuracy and efficiency in video object localization.

(i) Finding a 3D Major Axis for a Video Object

Figure 1:
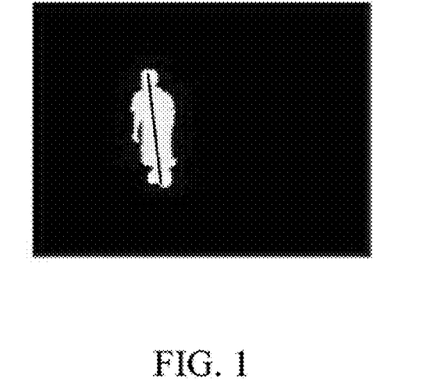
FIG. 1 is a diagram depicting an example of a foreground object and its 2D major axis estimated by principal component analysis in a camera view.

As shown in FIG. 1, we assume that the foreground region of a person is derived by background subtraction. We can then estimate its 2D MA via principal component analysis based on the foreground pixels of the person extracted by background subtraction.

Figure 2:
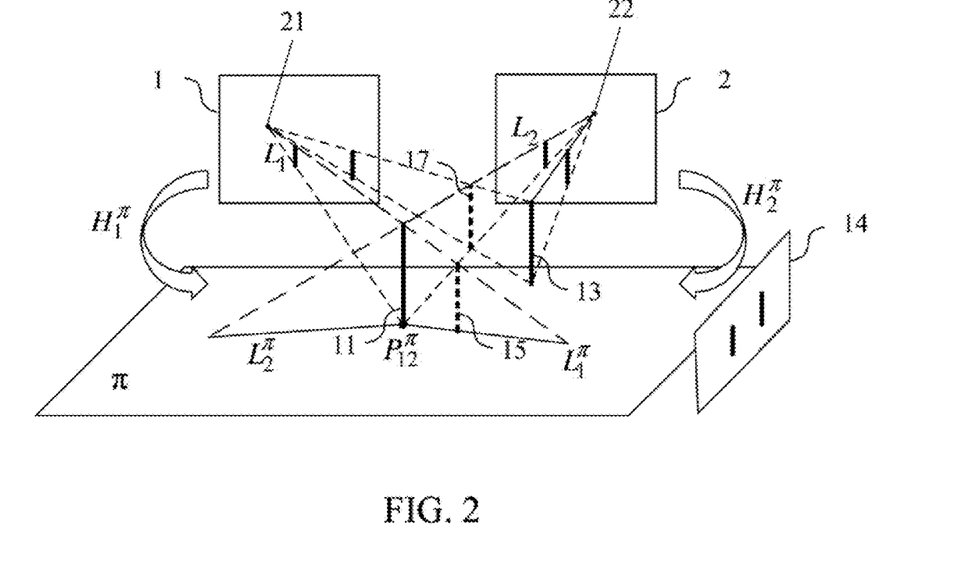
FIG. 2 is a diagram illustrating the main idea of the present disclosure.

By further assuming that the correspondences between the 2D MAs in two camera views are known, the 3D major axes (3D MAs) of the person can be reconstructed. For example, as shown in FIG. 2, the 2D MAs of the same person, denoted by $L_1$ and $L_2$ in camera View 1 and camera View 2, respectively, can be projected to a reference plane $\pi$ by homographic matrices $H_{1\pi}$ and $H_{2\pi}$. The intersection of the two projections $L_1^\pi$ and $L_2^\pi$ on $\pi$ can be denoted by $P_{12}^\pi$. Then, as shown in FIG. 2, a 3D MA $A_{1,2}$ of the video object 11 corresponding to the 2D MAs $L_1$ and $L_2$ in View 1 and View 2, respectively, can be derived by the intersection of two 3D planes, wherein one 3D plane consists of the camera center 21 and the 3D projection line $L_1^\pi$ of the 2D MA $L_1$, and the other 3D plane consists of the camera center 22 and the 3D projection line $L_2^\pi$ of the 2D MA $L_2$.

(ii) Finding 3D Major Axes for Multiple Video Objects

Now, we will extend the 3D MA estimation for one video object to that for multiple video objects. As shown in FIG. 2, a 3D MA obtained from the ith 2D MA in camera View 1 and the jth 2D MA in camera View 2 can be denoted by $A_{1i,2j}$.

Given M 2D MAs in View 1 and N 2D MAs in View 2, since we do not have correspondences of 2D MAs in the two views actually, the total number of possible 3D MAs in reconstruction will be MN. We then apply a procedure of filtering process (to be detailed later) to eliminate incorrect 3D MAs. FIG. 2 gives an illustration of two incorrect 3D MAs 15 and 17 that can be ruled out by the filtering process, wherein the information of extracted foreground pixels and 2D MAs in camera View 14 will be used. The remaining 3D MAs will correspond to the detected 3D objects in the scene of interest.

Vanishing Point-Based Line Sampling

For real scenarios, many objects may appear in the scene at the same time so that each segmented foreground region may contain more than one video objects. Under such situations of object occlusions, the 2D MA of each video object is hard to be detected correctly. Therefore, instead of estimating the 2D MAs for video objects, we propose to use 2D line samples of foreground regions in the present disclosure to construct 3D line samples. Then, by clustering the constructed 3D line samples into object groups, the 3D locations for video objects can be derived.

(i) Generating 2D Line Samples from Vanishing Points

Owing to the observation that video objects of interest, like people, are often perpendicular to the ground plane in most scenarios of video surveillance, these objects can be represented by 2D line samples that are originated from the vanishing point corresponding to vertical 3D lines of the scene of interest. For each camera view, such a vanishing point corresponding to 3D vertical lines of the scene is determined by the camera calibration process, as will be described later.

Figure 3A:
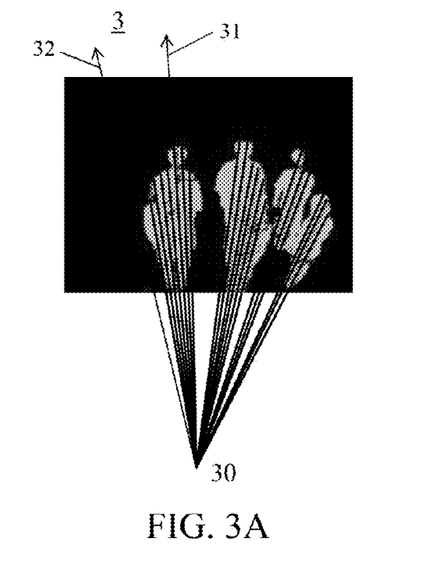
FIG. 3A and FIG. 3B are diagrams depicting two camera views of a scene of interest and the generated 2D line samples by an embodiment of the present disclosure.
Figure 3B:
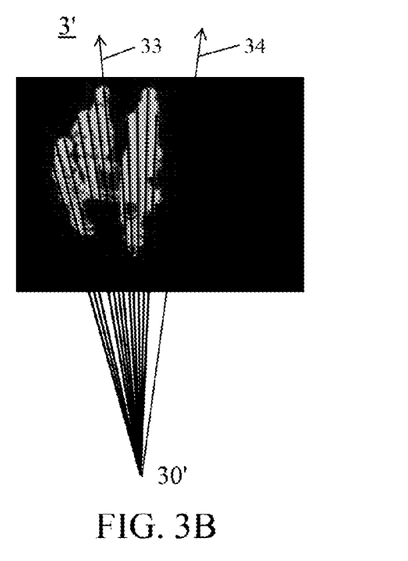

Examples of afore-mentioned 2D line samples in two camera views 3 and 3' are given in FIG. 3A and FIG. 3B, respectively. A plurality of 2D line samples that are originated from the vanishing points 30 and 30' and pass through the foreground regions are generated from 2D sampling rays. More precisely, the 2D sampling rays originated from the vanishing points 30 and 30' in the camera views 3 and 3' are firstly established for pre-specified angular positions. For example, the 2D sampling rays 31 and 33 originated from the vanishing points 30 and 30', respectively, pas through the foreground regions, while the 2D sampling rays 32 and 34 originated from the vanishing points 30 and 30', respectively, pass through the non-foreground regions. Then, the 2D line samples are generated by the line segments on the 2D sampling rays passing through the foreground regions. Note here that the pre-specification of a fixed vanishing point and the generation of the 2D sampling rays in a camera view are unrelated to an computation of image features in the video frames of the camera view.

(ii) Generating 3D Line Samples

Figure 3C:
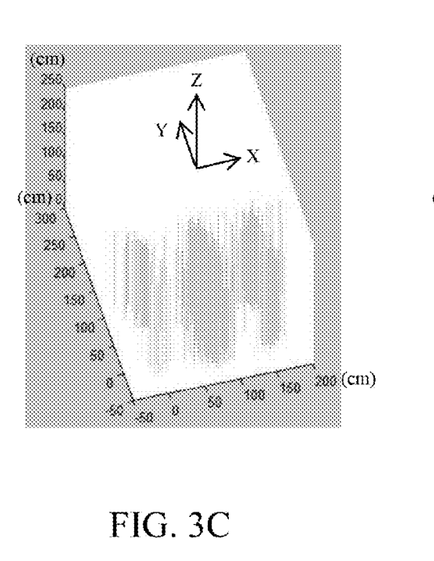
FIG. 3C is a diagram depicting the 3D line samples constructed from the 2D line samples in FIG. 3A and FIG. 3B in an embodiment of the present disclosure.
Figure 4:
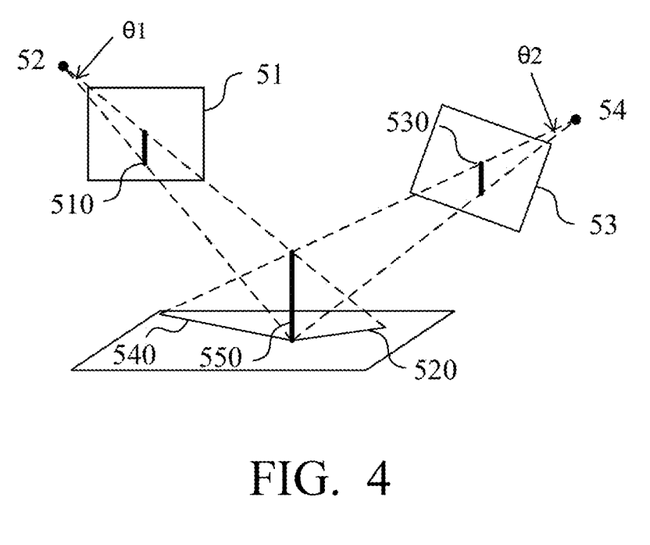
FIG. 4 is a diagram depicting the generation of a 3D line sample by the intersection of two 3D planes in an embodiment of the present disclosure, wherein the two 3D planes are computed from two 2D line samples in different camera views.

The 2D line samples in each pair of camera views, as shown in FIG. 3A and FIG. 3B for example, are then used to construct 3D line samples, as shown in FIG. 3C, via resolving the intersection of two 3D angles derived from a pair of 2D line samples in two different camera views. Specifically, as shown in FIG. 4, the 2D vanishing point pre-calibrated for the camera view 51 (53) corresponds geometrically to the projection of the camera center 52 (54) to the camera view along a 3D direction perpendicular to the ground plane. Each 2D sampling ray of an angular position originated from the vanishing point of a 2D camera view is thus a projection of a non-horizontal 3D plane, which contains the 3D camera center, to the 2D camera view. A 2D line sample that is a line segment of foreground region on a 2D sampling ray corresponds to an angle on the non-horizontal 3D plane, with a vertex of the angle being the camera center and two sides of the angle defined by the two ends of that line segment. For example, in FIG. 4, two 2D line samples 510 and 530 in the camera view 51 and 53, respectively, are presented. By projecting the 2D line sample 510 (530) to the reference plane via homography transformation, the projection line segment 520 (540) can be determined. A 3D angle $\theta1$ corresponding to the camera center 52, the 2D line samples 510 and the projection line segment 520 can then be computed. The other 3D angle $\theta2$ corresponding to the camera center 54, the 2D line samples 530 and the projection line segment 540 can be computed as well. By resolving the intersection of the two 3D angles $\theta1$ and $\theta2$, a 3D line sample 550 can then be obtained. A 3D line sample can also be obtained by resolving the intersection of two 3D planes derived from a pair of 2D line samples in two different camera views. As shown in FIG. 4, two 2D line samples 510 and 530 in the camera view 51 and 53, respectively, are presented. By projecting the 2D line sample 510 (530) to the reference plane via homography transformation, the projection line 520 (540) can be determined. A 3D plane corresponding to the projection line 520 and the camera center 52 can then be computed. The other 3D plane corresponding to the projection line 540 and the camera center 54 can be computed as well. By resolving the intersection of the two 3D planes, a 3D line sample 550 can then be obtained.

It is clear for now that, given each pair of 2D line samples from two different camera views, a 3D line sample can be derived. By using such a technique of vanishing point-based line sampling, the required computation of coordinate transformations of foreground pixels in all the camera views for object localization can be largely reduced.

Furthermore, since each of the 3D line samples is constructed by observations from two views only, some incorrect 3D line samples may be derived and need to be removed. A procedure of 3D line sample filtering is then applied to filter out a plurality of incorrect 3D line samples. In an embodiment, the following filtering rules are developed to rule out incorrect 3D line samples:

1. The length $|h_t-h_b|$ of a 3D line sample is shorter than $T_{len}$, where $h_t$ and $h_b$, are the heights of top and bottom end points of the 3D line sample, respectively.
2. The bottom height $h_b$, of a 3D line sample is higher than $T_{bot}$.
3. The foreground coverage of a 3D line sample by projecting the sample points of the 3D line sample back to all camera views is lower than $T_{fg}$.

Figure 3D:
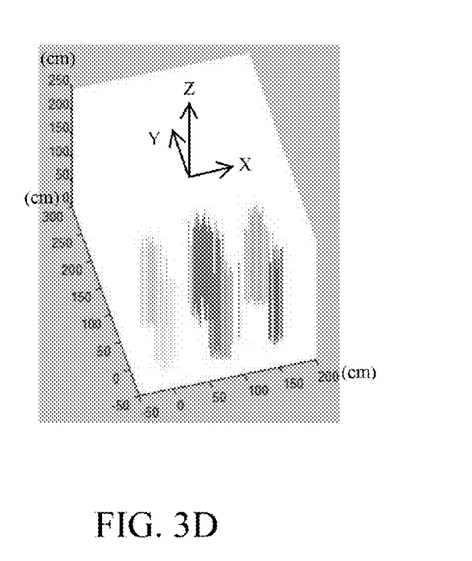
FIG. 3D is a diagram depicting the result of clustering the 3D line samples in FIG. 3C into six objects.

While the first two rules are intuitive, only the third rule is discussed in further detail here. To check the foreground coverage of a 3D line sample, the sample points of the 3D line sample are back projected to all camera views. For an object do appear in the monitored scene, these back-projected points should be covered by the corresponding foreground regions in the camera views. If all the back-projected points in all camera views are of foreground, the average foreground coverage rate (AFCR) of the 3D line sample is defined as 100%. A 3D line sample with an AFCR lower than a preset threshold $T_{fg}$ will be removed. FIG. 3D is a diagram showing the results of applying the 3D line sample filtering to FIG. 3C, wherein each individual person can now be better identified visually.

(iii) Computing 3D Object Locations

After the 3D line sample filtering, the remaining 3D line samples are clustering into 3D object groups using the breadth first search (BFS) in an embodiment of the present disclosure. Specifically, if the 2D horizontal distance between two 3D line samples on the top view of the scene is closer than a threshold $T_{conn}$, an edge between the two 3D line samples is established in an undirected graph. FIG. 6A and FIG. 6B are diagrams showing an image frame of one camera view and the reconstructed top view of a resultant graph of BFS, respectively, in an embodiment of the present disclosure. In FIG. 6B, each graph node on the top view denotes a 3D line sample. Six clusters corresponding to six people are found by the BFS grouping. The center position and the average height of each cluster can then be estimated (via various average schemes) to represent the object location and its height.

Figure 5A:
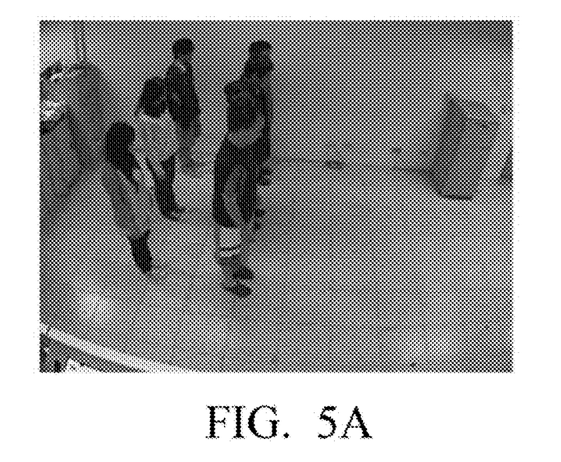
FIG. 5A and FIG. 5B are diagrams depicting, respectively, an example of a 2D camera view and the clustering results of 3D line samples in top view in an embodiment of the present disclosure.
Figure 5B:
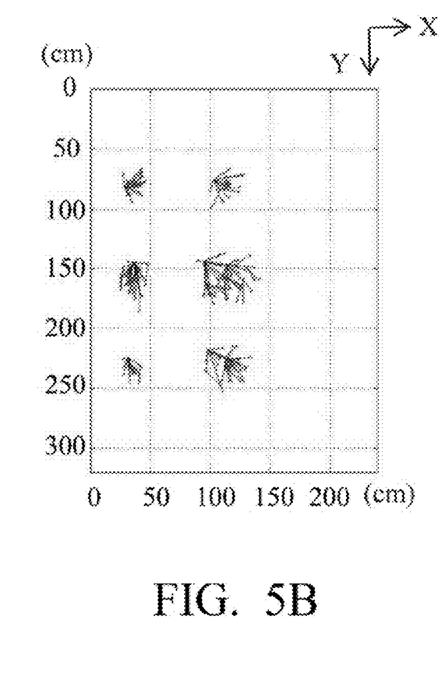
Figure 5C:
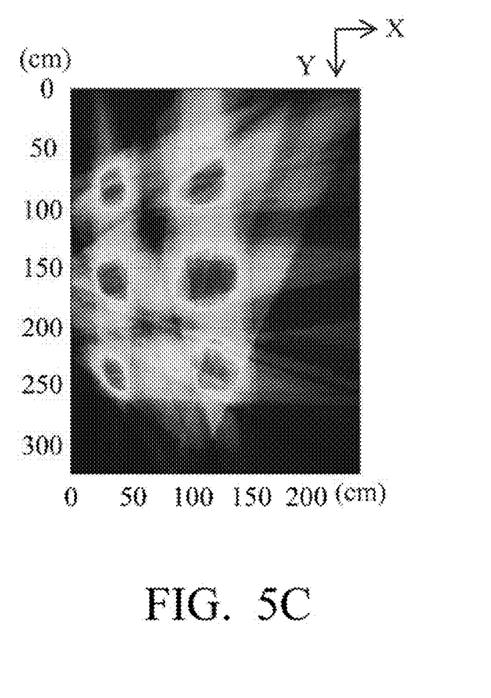
FIG. 5C is a diagram depicting a synergy map derived by using S. M. Khan and M. Shah, "Tracking multiple occluding people by localizing on multiple scene planes"

In FIG. 5C, as a reference, we show the synergy map obtained by using the method proposed in S. M. Khan and M. Shah, "Tracking multiple occluding people by localizing on multiple scene planes," IEEE Trans. Pattern Analysis and Machine Intelligence, vol. 31, no. 3, pp. 505-519, 2009. It is clear that the distributions of the derived clusters by the proposed approach in FIG. 5B is similar to that of the compared approach in FIG. 5C, which validate the effectiveness of the proposed approach. Regarding the comparisons of computational efficiency, the proposed approach is more than twenty-five times faster than the compared approach in our experimental simulations using the video sequence of FIG. 5A as a test bench on Windows 7 with, 4 GB RAM and a 2.4 G Intel Core2 Duo CPU.

Camera Calibration Process

After the 3D line sample filtering, the remaining 3D line samples are clustering into 3D object groups using the breadth first search (BFS) in an embodiment of the present disclosure. Specifically, if the 2D horizontal distance between two 3D line samples on the top view of the scene is closer than a threshold $T_{conn}$, an edge between the two 3D line samples is established in an undirected graph. FIG. 5A and FIG. 5B are diagrams showing an image frame of one camera view and the reconstructed top view of a resultant graph of BFS, respectively, in an embodiment of the present disclosure. In FIG. 5B, each graph node on the to view denotes a 3D line sample. Six clusters corresponding to six people are found by the BFS grouping. The center position and the average height of each cluster can then be estimated (via various average schemes) to represent the object location and its height.

The four pillars can also be utilized to estimate the homography transformations from a camera view to multiple 3D reference planes of different heights of the scene. Specifically, as indicated in R. Eshel and Y. Moses, "Tracking in a Dense Crowd Using Multiple Cameras," International Journal of Computer Vision, vol. 88, no. 1, pp. 129-143, 2010, one can use four vertical pillars placed in the scene, with marker points at three known heights on each of them, to establish the homographies between a camera view and any 3D reference planes at desired heights. Since a new reference point at any height along a pillar can be identified in the images using the cross-ratio along that pillar, the above homographic relationship can actually be established for planes at arbitrary height. Note that the derived homography transformations can also be used to back-project points on a 3D reference plane to the camera views as required by other computational processes.

Flowchart of the Video Object Localization Method

Figure 6:
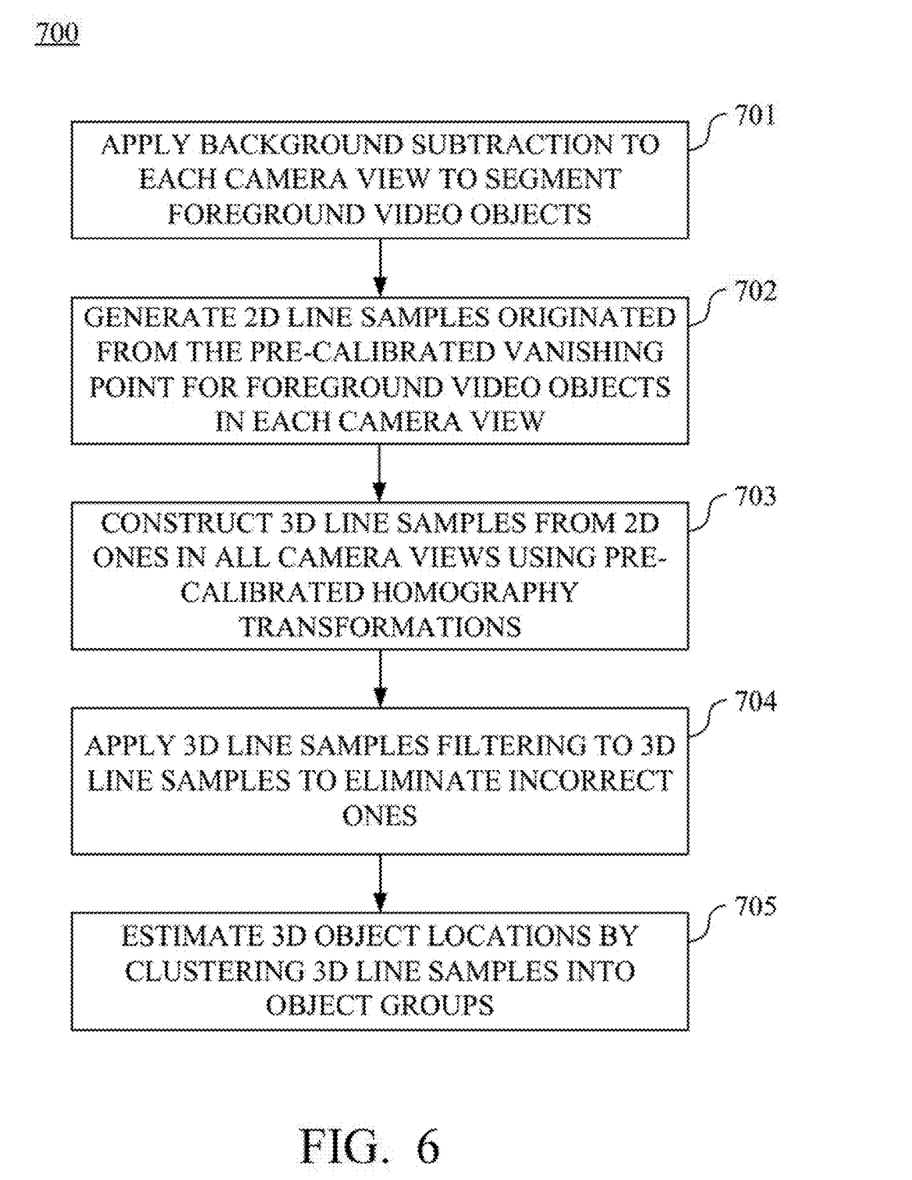
FIG. 6 is a flowchart of the 3D object localization process of an embodiment of the present disclosure.

FIG. 6 is a flowchart of an object localization method 700 of an embodiment of the present disclosure. The object localization method 700 comprises the steps as outlined in the sentences that follow.

In step 701, background subtraction is applied to the captured image from each camera to segment foreground video objects.

In step 702, 2D line samples that are originated from the pre-calibrated vanishing point are generated for the foreground video objects in each camera view.

In step 703, 3D line samples are constructed from the 2D line samples in all the camera views using pre-calibrated homography transformations.

In step 704, 3D line sample filtering is applied to the 3D line samples to eliminate incorrect ones.

In step 705, 3D object locations are estimated by clustering the remaining 3D line samples into object groups.

Using 2D line sampling in camera views for object localization can avoid the complicated axis analysis of video objects and can effectively handle partial occlusion problems. Furthermore, the method of the present disclosure enhances the efficiency of object localization because only a few samples of foreground pixels are processed in the computation of coordinate transformations.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An object localization method using multiple cameras comprising the steps of:

obtaining a plurality of two-dimensional (2D) line samples based on foreground pixels in a camera view for a scene of interest, wherein the 2D line samples are foreground line segments along a plurality of 2D sampling rays that are originated from a pre-specified and fixed vanishing point in the camera view and established, regardless of any image feature, for pre-specified angular positions for representing the projections of non-horizontal three-dimensional (3D) planes containing a camera center to the camera view, and each of the 2D line samples corresponds to an angle on the non-horizontal 3D plane with a vertex of the angle being the camera center and two sides of the angle defined by the two ends of the foreground line segment, for representing foreground video objects for the scene of interest;

constructing a plurality of 3D line samples that stand on at least one 3D reference plane for the scene of interest from the 2D line samples in multiple camera views, wherein the 3D line samples are obtained by intersecting the angles associated with the 2D line samples; and determining 3D locations of foreground objects by clustering the 3D line samples into object groups.

2. The object localization method of claim 1, wherein the vanishing point is determined according to a plurality of calibration pillars in parallel in the scene of interest.

3. The object localization method of claim 1, wherein a 3D reference plane is the plane of a preset height in the scene of interest.

4. The object localization method of claim 1, further comprising a filtering process for ruling out a plurality of incorrect 3D line samples in 3D line samples.

5. The object localization method of claim 4, wherein the step of the filtering process comprises discarding the 3D line samples whose lengths are shorter than a specific threshold.

6. The object localization method of claim 4, wherein the step of the filtering process comprises discarding the 3D line samples whose bottom heights are higher than a specific threshold.

7. The object localization method of claim 4, wherein the step of the filtering process comprises discarding the 3D line samples whose foreground coverage rates are lower than a specific threshold, wherein the foreground coverage rate of a 3D line sample is calculated based on the number of foreground pixels on the projections of the 3D line sample back to all the camera views.

8. The object localization method of claim 1, wherein the step of determining 3D locations of foreground objects comprises a step of determining a major axis of each foreground object from its clustered 3D line samples.

* * * * *